May 22, 1934. E. O. LÖFGREN 1,959,482
MEANS FOR ENERGIZING RADIO APPARATUS
Filed Jan. 22, 1930 4 Sheets-Sheet 2

E. O. Lofgren
INVENTOR

By Marks & Clerk
Attys.

May 22, 1934.   E. O. LÖFGREN   1,959,482
MEANS FOR ENERGIZING RADIO APPARATUS
Filed Jan. 22, 1930   4 Sheets-Sheet 3

E. O. Lofgren
INVENTOR
By Marks & Clerk
ATT'YS.

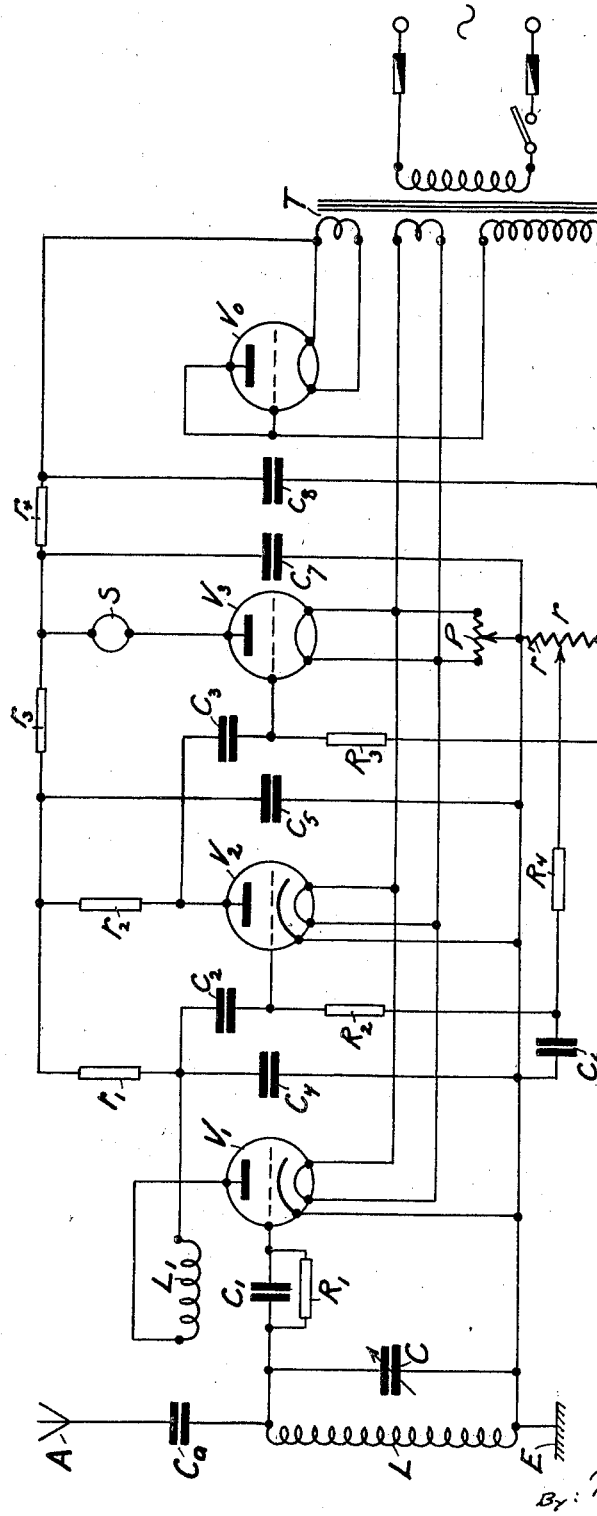

Patented May 22, 1934

1,959,482

UNITED STATES PATENT OFFICE 1,959,482

MEANS FOR ENERGIZING RADIO APPARATUS

Erik Olof Löfgren, Stocksund, Sweden, assignor to Telefonaktiebolaget L. M. Ericsson, Stockholm, Sweden, a company of Sweden Application January 22, 1930, Serial No. 422,658
In Sweden January 29, 1929

3 Claims. (Cl. 250—27)

The present invention has for its object a circuit arrangement in such wireless apparatus, amplifiers or the like which are supplied with anode current and, if desired, also with grid voltage from a direct current source affected by ripples, by way of example, a rectifier. In order to prevent the voltage ripples from disturbing the normal operation of the apparatus, special measures must generally be taken either by the provision of a filter included between the current source and the apparatus, or else by mutually adjusting the voltage ripples entering the apparatus in different points in such a manner that a compensation of the ripples is brought about in the output circuit of the last valve. To the latter category appertains a circuit arrangement described in the following. Its main field of application concerns the supply of current from alternating current mains through the intermedium of a rectifier. On the one hand, it is then desirable to avoid any increase in the current consumption caused by a voltage divider from which the mutually compensating voltages are tapped off and, on the other, a bridging condenser is required in the anode circuit of the valve which condenser is connected across the comparatively high impedance of the rectifier device. Both these requirements are met according to the present invention.

Said invention is based upon the well-known phenomenon that ripples in the anode current of a valve may be eliminated by impressing upon the grid an alternating potential of opposite phase to the anode alternating potential and having an amplitude $1/\mu$ thereof, where $\mu$ is the amplification coefficient of the valve (compare by way of example Barkhausen, Elektronen-Röhren, Leipzig 1923, page 39). The novel feature of the invention resides in the provision of means for producing a grid alternating potential of said nature under the conditions prevailing in supplying current through the intermedium of a rectifier. Said means are constituted by a combination of resistances and condensers. In certain cases those condensers and resistances may be used for said purpose which in any case are required in the type of apparatus in question the invention being thus limited to the dimensioning of said parts.

Figure 1:
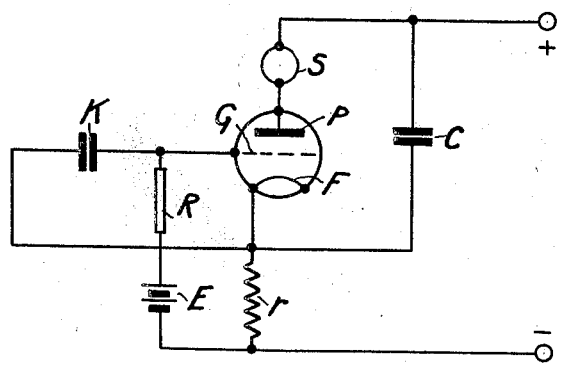
Figure 2:
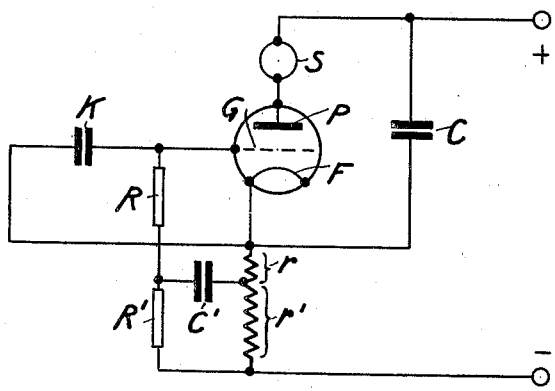
Figure 3:
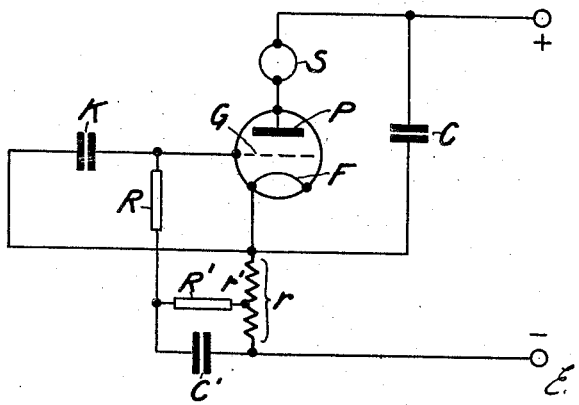
Figure 4:
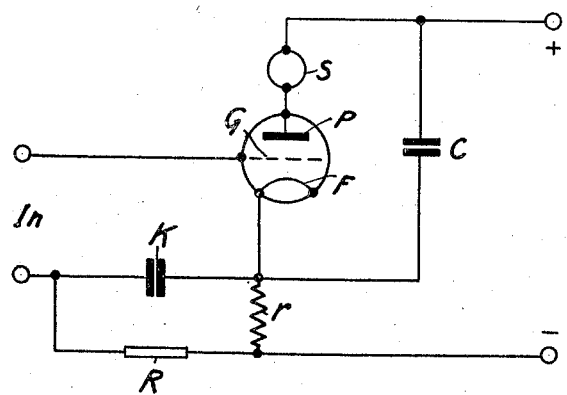
Figure 5:
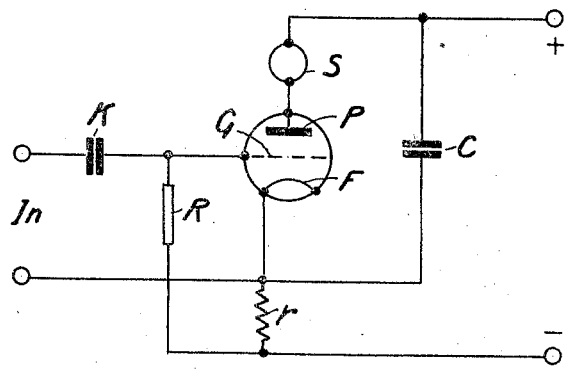
Figure 6:
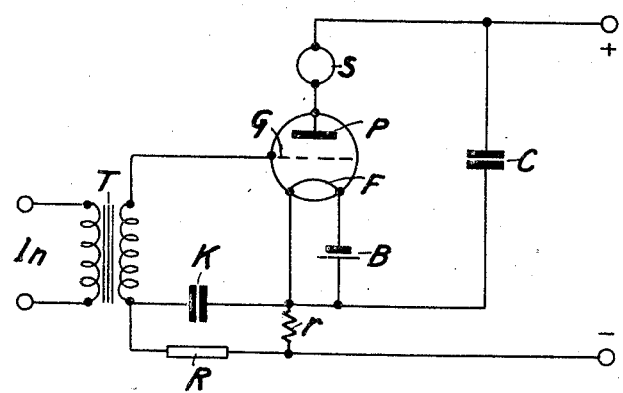
Figure 7:
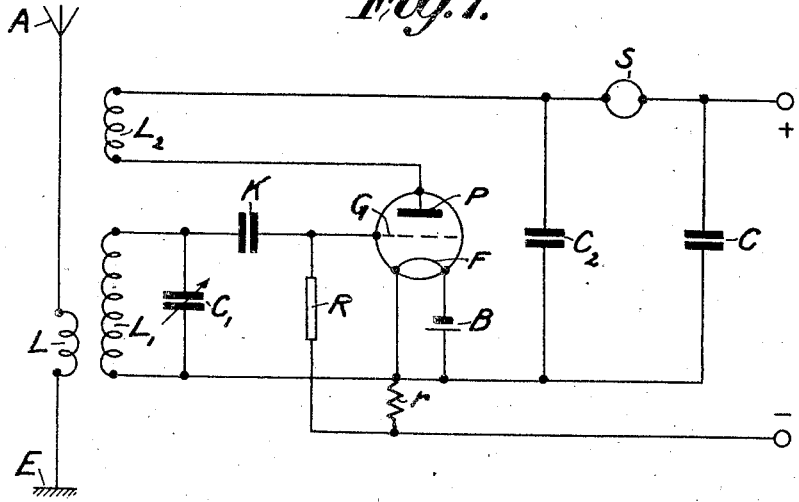

The invention will be more closely described in the following with reference to the accompanying drawings, Figures 1 to 8. Of said figures, Figure 1 illustrates only the arrangement in principle to bring about the compensation in an electronic valve, the proper operation of the valve as amplifier or detector being then disregarded for the sake of simplicity. Figures 2 and 3 constitutes two modifications of the preceding one in which modifications, except the anode voltage, also the grid voltage of the valve is tapped off from the direct current source affected by ripples. Figures 4 and 5 show two different methods to arrange the input circuit of the valve. Figures 6 and 7 show circuit diagrams for a single valve amplifier and a single valve wireless receiver respectively. Finally, Figure 8 shows a complete circuit diagram for a resistance connected three valve receiver.

The terminals plus and minus in Figure 1 are assumed to be the tappings from the direct current source affected by ripples. Therefrom the anode current is supplied to the electronic valve the electrodes of which are designated F, G and P. In the anode circuit the loud speaker S or any other equivalent device is included. The condenser C forms a bridge for the anode alternating current having a low impedance across the rectifier. It is without importance in which manner the cathode F is heated. Between the cathode F and the negative terminal of the current source a resistance r is included in parallel with a circuit comprising the condenser K, the resistance R and the grid battery E. To the junction point between the condenser K and the resistance R the grid G is connected. As regards the relative sizes of said connecting elements it is assumed that the resistance R is of a higher order of magnitude than both the resistance r and the impedance of the condenser K counted at the frequency of the ripples. It may now be proved that the quantities C, r, K and R may be so adjusted that the loud speaker S is not influenced by the ripples in the current source. When calculating the required values of said quantities only the fundamental wave of the ripples is regarded for the sake of simplicity, the angular frequency of said ripples being designated $\omega$. Starting from the assumption that the compensated condition is realized the whole alternating current component I delivered from the current source will pass the condenser C and further through the resistance $r$. The drop of voltage over the condenser, i. e. the anode alternating potential of the valve is then $$V_a = \frac{I}{j\omega C}.$$

Over the resistance $r$ a drop of voltage $rI$ is produced which causes a current $$\frac{rI}{R}$$

in the circuit KRE. By multiplication with the impedance of the condenser K the drop of voltage is then obtained across said condenser. Said drop of voltage with reversed sign is just the grid alternating potential of the valve which thus obtains the value $$V_g = \frac{r.I}{j\omega KR}.$$

The condition for the mutual compensation of the influence of the grid alternating potential and the anode alternating potential in the anode circuit is as above mentioned $$V_g = -\frac{1}{\mu} V_a$$

which results in $$\frac{rI}{j\omega KR} = \frac{1}{\mu} \cdot \frac{I}{j\omega C}$$

or $$KR = \mu Cr$$

From the equation the important conclusion is drawn that the condition for compensation is independent of the frequency. The above mentioned condition that R should be large in comparison with $r$ and $$\frac{1}{\omega K},$$

is also for the higher harmonics of the ripples, as is readily understood.

If the resistance $r$ is selected of such a size that the drop of voltage caused by the anode direct current therein is equal to the grid voltage required in the valve the grid battery E may be disposed of. Even if it is impossible to adjust the resistance $r$ in this manner one may make use of the anode direct current to obtain the desired grid potential according to Figures 2 and 3. The figures represent the two cases that the resistance $r$ either is too small or too large. The condenser C' must of course be given such a size that its impedance is of a small order of size in comparison with the two resistances R and R'.

Hitherto the operation of the valve as amplifier or detector has been disregarded and it has been assumed that the circuit arrangement on the grid side could be arranged at will. In reality the grid must in one way or another be associated with an input circuit over which the alternating current to be amplified or rectified enters. A simple study shows that this preferably may take place according to some of the arrangements indicated in Figures 4 and 5. For the sake of simplicity it has here been assumed that any special arrangements according to Figures 2 and 3 to establish the grid voltage are not required. As regards the properties of the input circuits to which the input terminals marked in Figures 4 and 5 have to be connected certain conditions must be present to realize the above mentioned state of compensation. Within the range of frequencies of the ripples in the anode current source, the impedance of the input circuit should thus be of a lower order of size than the grid cathode impedance in the arrangement according to Figure 4 or the impedance of the condenser K respectively as regards the arrangement in Figure 5. Further the input circuit should in the former case be conductive for direct current in order to let through the grid biasing voltage from the resistance R to the grid. The choice between the two methods of connection is influenced by a number of facts, which are not more closely described in this connection.

Figures 6 and 7 illustrate the practical application of both circuit arrangements in two simple cases. In Figure 6 the valve is connected as a low frequency amplifier. The alternating current to be amplified enters the two input terminals "In" to a transformer T the secondary winding of which, as is well known, has a comparatively high impedance. In Figure 7 the valve operates again as a detector for the high frequency oscillations being induced in the oscillatory circuit $L_1C_1$ from the antenna circuit ALE. The impedance of the tuning coil $L_1$ for the low frequent ripples is of course exceedingly insignificant. The reaction coil $L_2$ and the bridging condenser $C_2$ are in this connection not of any special interest. The filament current source consists in both connections of a battery B but, of course, alternating current may just as well be used in known manner for the heating.

In many cases it might be desirable, on account of the tolerances which must be allowed in the size of condensers and resistances as well as in the amplification coefficient of the valves, that a possibility of adjustment is available to ensure an adjustment of the compensation to an optimum value under any circumstances. This fine adjustment may of course theoretically take place in anyone of the quantities R, K, $r$ and C. The last quantity is, however, the least suitable in practice.

In multiple valve apparatus several possibilities as regards the application of the invention are conceivable. One may thus compensate only a single valve, by way of example the last valve in resistance connected apparatus, the comparatively large anode current of which is more expensive to filter than the insignificant current of the resistance connected valves. Or, the compensation connection might be applied in several valves simultaneously. It is further conceivable that the compensation is so carried out that also ripples entering from other valves are eliminated, i. e. that the apparatus as a whole will be compensated. It is often suitable to provide for an easy filtering prior to the compensation.

Figure 8 shows a complete circuit diagram of a resistance connected three valve receiver. As the same on the whole agrees with ordinary standard connections any further description thereof appears unnecessary. Resistance condenser filtering has here been used for the total rectified current, by means of $r_4$ and $C_8$, and also for the anode current of the two first valves, by means of $r_3$ and $C_5$, and finally for the grid voltage of the second valve, by means of $R_4$ and $C_6$. The coupling condenser $C_3$ and the grid leak $R_3$ for the last valve $V_3$ serve, in conformity with the coupling elements above designated K and R respectively, to bring about the compensation. In series with the condenser $C_3$ between the grid and cathode of the valve a resistance is included consisting of the internal and the external anode resistance of the preceding valve connected in parallel. This reduced resistance should be kept small in relation to the impedance of the condenser $C_3$ which again may be brought about by a suitable selection of the valve type and by the utilization of a comparatively small external anode resistance $r_2$ and a comparatively high anode voltage. If it is desired to attain the highest possible freedom from disturbances one may compensate such a resistance in series with the grid condenser by the introduction of a corrective resistance in series with the bridging condenser $C_7$ of the anode circuit. It is quite easy to complete the above mentioned calculations with regard to this correction. When using the same designations and, besides, $\rho$=the resistance in series with the grid condenser and $r_c$=the corrective resistance in series with the condenser of the anode circuit, the equation $$r_c = \frac{\mu r}{R} \cdot \rho$$

is obtained.

The invention may be modified in different manners without receding from the fundamental idea set forth in the above description. By way of example a correction might thus be introduced also for the deviation from the ideal conditions caused thereby that the impedance of the condenser K is not very small in comparison with the resistance R. Further other methods than those indicated in Figures 2 and 3 are conceivable to tap off the grid voltage in case the resistance $r$ is not of a size suitable therefore. Said and also other modifications of the idea of the invention are, of course, comprised in the patent protection applied for.

I claim:

1. A circuit arrangement for supplying anode current from a direct current source affected by ripples to electronic valves including a cathode, a grid, and an anode, said arrangement comprising an indicator included in the anode circuit of the output valve, a smoothing condenser included between the positive terminal of the current source and the cathode of said valve, a grid biasing resistance interconnected between the cathode and the negative terminal of the current source, a grid voltage smoothing resistance, an auxiliary condenser, the grid of said valve being connected, on the one side, to the negative terminal of the current source through said grid voltage smoothing resistance, and, on the other side, to the cathode through said auxiliary condenser, the auxiliary condenser being so dimensioned in relation to the smoothing condenser, the resistances and the amplification factor of the valve, that its capacity is equal to the capacity of the smoothing condenser multiplied by the amplification factor of the valve and the ratio between the grid biasing resistance and the grid voltage smoothing resistance.

2. A circuit arrangement as claimed in claim 1, the output valve being connected in cascade to a preceding one by means of resistance coupling, characterized in that said grid voltage smoothing resistance is constituted by the grid leak resistance and said auxiliary condenser is constituted by the coupling condenser between the valves.

3. A circuit arrangement as claimed in claim 1, in which corrective impedances are included between the positive terminal of the current source and the cathodes of said valves for introducing a resistance component in addition to the capacitance component of the smoothing condenser, said resistance component being small in comparison with said capacitance component.

ERIK OLOF LÖFGREN.